US012749036B2

(12) United States Patent
Makhijani et al.

(10) Patent No.: US 12,749,036 B2
(45) Date of Patent: Sep. 29, 2026

(54) ORDER-SPECIFIC EXPANSION OF AN AREA ENCOMPASSING PICKERS AVAILABLE FOR ACCEPTING ORDERS PLACED WITH AN ONLINE SYSTEM

(71) Applicant: Maplebear Inc., San Francisco, CA (US)

(72) Inventors: Rahul Makhijani, Daly City, CA (US); Pak Tao Lee, Foster City, CA (US); Shang Li, Jersey City, NJ (US)

(73) Assignee: Maplebear Inc., San Francisco, CA (US)

( * ) Notice: Subject to any disclaimer, the term of this patent is extended or adjusted under 35 U.S.C. 154(b) by 215 days.

(21) Appl. No.: 18/211,124

(22) Filed: Jun. 16, 2023

(65) Prior Publication Data

US 2024/0420051 A1 Dec. 19, 2024

(51) Int. Cl.
*G06Q 10/0631* (2023.01)

(52) U.S. Cl.
CPC .............................. *G06Q 10/06316* (2013.01)

(58) Field of Classification Search
None
See application file for complete search history.

(56) References Cited

U.S. PATENT DOCUMENTS

| | | | | |
|---|---|---|---|---|
| 10,789,568 | B2 * | 9/2020 | Greenberger | G06Q 10/08355 |
| 2014/0279294 | A1 * | 9/2014 | Field-Darragh | H04B 5/77 705/28 |
| 2019/0206008 | A1 * | 7/2019 | Dutta | G06N 20/20 |
| 2019/0236740 | A1 * | 8/2019 | Rao | G06Q 10/06315 |
| 2022/0188910 | A1 * | 6/2022 | Jin | G06Q 30/0635 |
| 2023/0229161 | A1 * | 7/2023 | Cacioppo | G05D 1/648 701/23 |
| 2024/0193540 | A1 * | 6/2024 | Selvam | G06N 20/00 |

* cited by examiner

*Primary Examiner* — Chesiree A Walton
(74) *Attorney, Agent, or Firm* — Fenwick & West LLP

(57) ABSTRACT

Embodiments relate to order specific expansion of an area that encompasses pickers available for accepting an order placed with an online system. The online system accesses a computer model trained to predict an attractiveness metric for the order and applies the computer model to predict a value of the attractiveness metric for a first order. The online system classifies the first order into a first set or a second set, based on the value of the attractiveness metric and a threshold. Based on the classification, the online system expands over time a size of an area that encompasses a set of pickers available for accepting the first order. The online system causes a device of each picker in the set of available pickers located within the area of the expanded size to display an availability of the first order for acceptance by each picker in the set of available pickers.

18 Claims, 6 Drawing Sheets

300

400

ORDER-SPECIFIC EXPANSION OF AN AREA ENCOMPASSING PICKERS AVAILABLE FOR ACCEPTING ORDERS PLACED WITH AN ONLINE SYSTEM

BACKGROUND

Online systems, such as online concierge systems, typically apply, for all orders, the same maximum driving distance filter from a warehouse. This means that pickers who are located more than a fixed threshold distance from the warehouse do not see orders associated with that warehouse. Over time, as orders are made available but not accepted, a radius of the maximum driving distance filter is expanded to make the orders available to more pickers so that the delay in accepting the order by a picker does not cause the order to be delivered late. More attractive orders may not need as much expansion of the maximum driving distance filter. But if the radius of the maximum driving distance filter is expanded too fast, less efficient matching may be achieved. For example, a picker who is farther away from a warehouse may accept an order before another picker who is closer to the warehouse. Accordingly, it is desirable to set and expand this radius in a way that strikes a balance between too fast and too slow, avoiding late deliveries but minimizing inefficiencies. Conventionally, there are no technical solutions to achieve these goals, and it is infeasible to perform this determination manually.

SUMMARY

In accordance with one or more aspects of the disclosure, an online concierge system receives, from a user of the online concierge system, a first order placed with the online concierge system. The online concierge system accesses a computer model of the online concierge system trained to predict an attractiveness metric for an order placed with the online concierge system. The online concierge system applies the computer model to predict a value of the attractiveness metric for the first order, based on one or more features of the first order. In one or more embodiments, the attractiveness metric comprises a proxy for the desirability of the order, such as a predicted time to accept (TTA) the order by a picker. The online concierge system then uses the predicted attractiveness metric to determine a group of pickers to whom to make the order available, which may be defined according to an area in which the pickers are located. This determined group of pickers may be set initially and then expanded as a rate determined by the predicted attractiveness metric.

In one or more embodiments, the online concierge system classifies the first order into a first set of orders or a second set of orders based on the value of the attractiveness metric and a threshold. In one or more other embodiments, the online system classifies the first order into a first set of orders or a second set of orders by clustering the orders according to their attractiveness metrics. The online concierge system expands over time, based on the classifying of the first order, a size of an area that encompasses a set of pickers associated with the online concierge system available for accepting the first order, wherein a number of pickers in the set is correlated with the size of the area. The online concierge system causes a device of each picker in the set of available pickers located within the area of the expanded size to display an availability of the first order for acceptance by each picker in the set of pickers.

DETAILED DESCRIPTION

Figure 1:
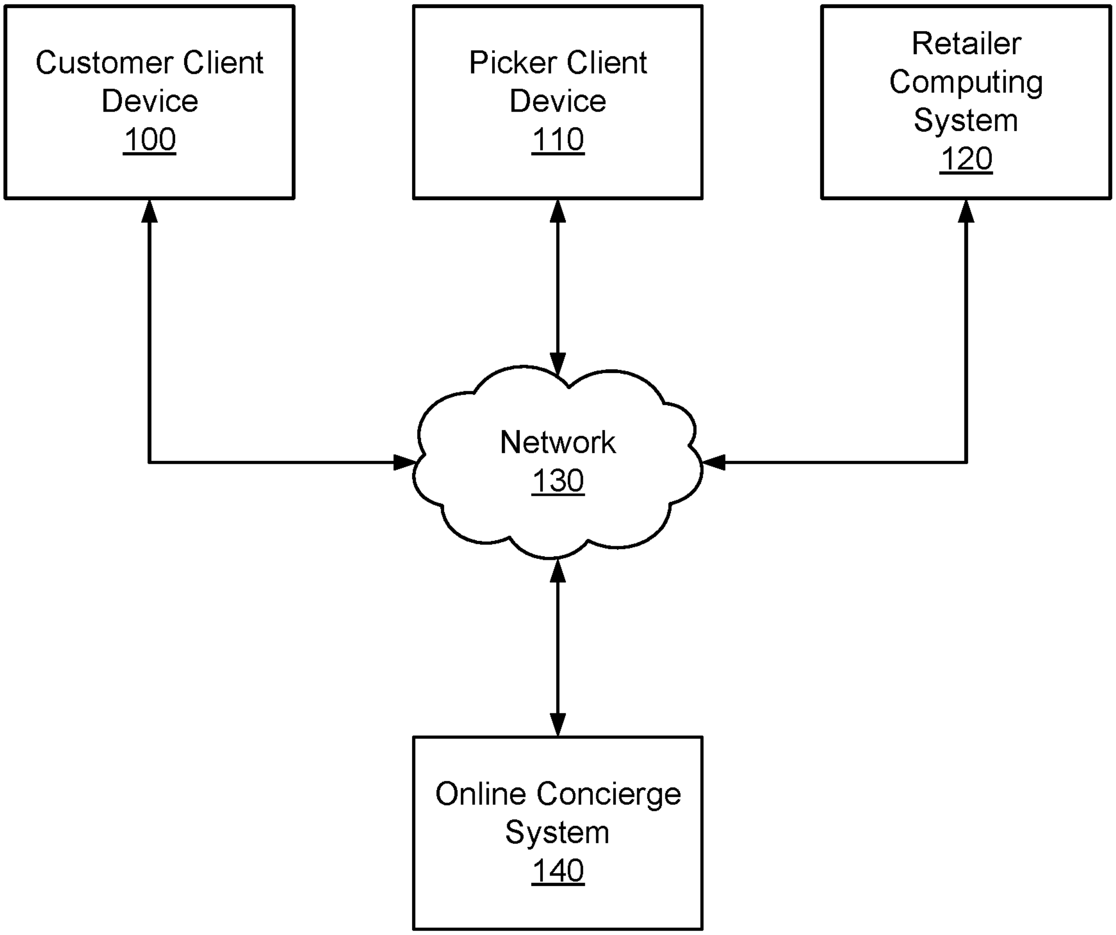
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, so that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provide portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140.

The online concierge system 140 makes orders (i.e., batches) placed by customers available to a plurality of pickers associated with the online concierge system 140, who can view, select, and then fulfill the orders by traveling to a specific warehouse (or grocery store) to pick items associated with each order and deliver the order to a corresponding customer. For efficiency (i.e., to reduce travel time of pickers), the online concierge system 140 first makes an order available to an initial set of pickers who are within a threshold distance from a corresponding warehouse. If the order is not accepted over a defined period of time, the online concierge system 140 expands a radius of an area that encompasses pickers who can accept the order, wherein a center of the area corresponds to a location of the warehouse. Because more attractive orders are more likely to be accepted than less attractive orders, more attractive orders do not need as much expansion of the area as less attractive orders. Furthermore, if the radius of the area is expanded too fast, then the online concierge system 140 may achieve the less efficient matching, i.e., a picker who is farther away from the warehouse may accept an order before another picker who is closer to the warehouse. Therefore, differently attractive orders need to be made available over time to an expanded number of pickers at a different rate.

The online concierge system 140 predicts an attractiveness of an order using a trained computer model that predicts an attractiveness metric for the order, and then expands the radius of the area less aggressively for more attractive orders. The attractiveness metric for the order may be an estimated time to accept (TTA) the order. A TTA for the order represents an estimated amount of time for a picker of a plurality of pickers associated with the online concierge system 140 to accept the order once the order is made available to the plurality of pickers. If a value of the attractiveness metric for the order is greater than or equal to a threshold value, the online concierge system 140 classifies the order as an "attractive order"; and if a value of the attractiveness metric for the order is less than the threshold value, the online concierge system 140 classifies the order as a "normal order". Based on the classification of each order (i.e., an attractiveness of each order to pickers), the online concierge system 140 tunes a maximum driving distance filter for each order. Hence, over time, the online concierge system 140 expands the radius of the area more slowly for attractive orders than for less attractive orders. More details about this approach are described in relation to FIGS. 2 through 5.

Figure 2:
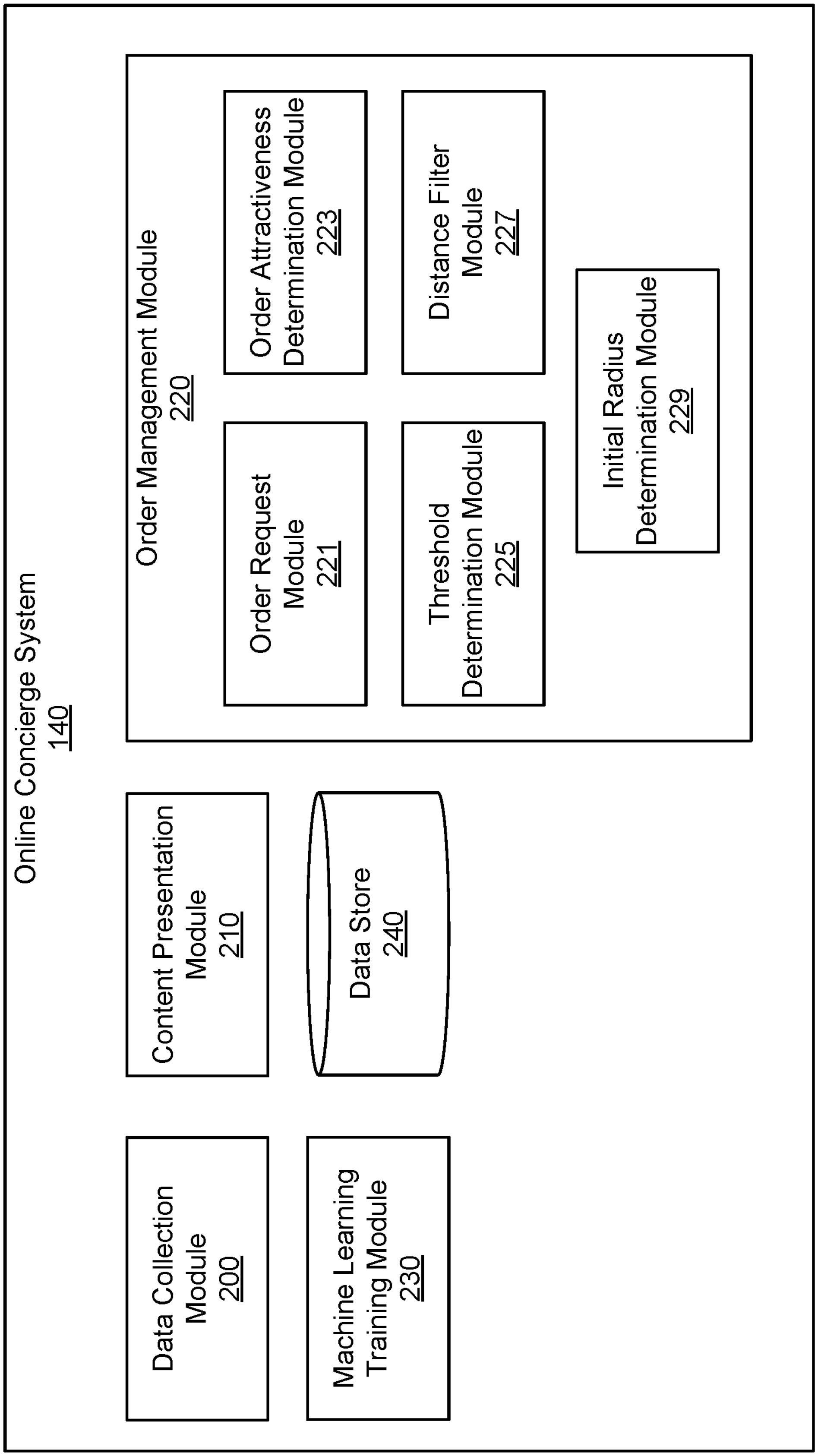
FIG. 2 illustrates an example system architecture for an online concierge system, in accordance with one or more embodiments.

FIG. 2 illustrates an example system architecture for the online concierge system 140, in accordance with some embodiments. The system architecture illustrated in FIG. 2 includes a data collection module 200, a content presentation module 210, an order management module 220, a machine-learning training module 230, and a data store 240. The order management module 220 includes an order request module 221, an order attractiveness determination module 223, a threshold determination module 225, a distance filter module 227, and an initial radius determination module 229. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of the order. In some embodiments, the order management module 220 computes an estimated time of arrival of the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The order request module 221 of the order management module 220 may receive, from a customer of the online concierge system 140, an order placed with the online concierge system 140. The customer may place the order via the customer client device 100, and the order may be provided to the order request module 221 via the network 130. The order request module 221 may extract one or more features of the placed order and provide the extracted features to, e.g., a computer model deployed by the order attractiveness determination module 223. The features of the order may include at least one of: a total monetary value of the order, a monetary value of a tip from a customer associated with the order, information about heaviness of items in the order, a delivery distance, a number of different items in the order, a quantity of each item in the order, information about a warehouse associated with the order, an indication of RX (pharmacy/prescription) delivery associated with the order, an indication of alcohol delivery associated with the order, information about a service order delivery (e.g., priority delivery or standard delivery) associated with the order, etc. Note that any picker-related features (e.g., a driving distance from each picker location to a warehouse, an average picker distance to the warehouse, picker level features, etc.) may not be utilized as inputs into the computer model.

The order attractiveness determination module 223 may determine a metric that quantifies an attractiveness of the order. The order attractiveness determination module 223 may apply a computer model trained to determine how attractive the order is for acceptance by a picker at a warehouse level. The computer model deployed by the order attractiveness determination module 223 may run a machine-learning algorithm to determine the metric that quantifies the order's attractiveness. The order attractiveness determination module 223 may determine an attractiveness of the order assuming the picker is already at a warehouse, i.e., the picker does not have to travel any distance to get to a location of the order. A set of parameters for the trained computer model may be stored on one or more non-transitory computer-readable media of the order attractiveness determination module 223. Alternatively, the set of parameters for the computer model may be stored on one or more non-transitory computer-readable media of the data store 240.

The computer model deployed by the order attractiveness determination module 223 may operate as an order classification machine-learning model that classifies each order into one of two groups (or clusters), i.e., into a group of "attractive orders" and a group of "normal orders". The computer model may be trained (e.g., via the machine-learning training module 230) to determine, based on one or more features of an order, whether or not the order is attractive to pickers at a warehouse level (e.g., when a driving distance to a warehouse is zero for all pickers). As more attractive orders typically have a lower TTA, in some embodiments, the computer model is trained (e.g., via the machine-learning training module 230) to predict a TTA for the order. In such cases, the computer model operates as an order attractiveness TTA machine-learning model. If the predicted TTA is less than a threshold value, the computer model may classify the order as an "attractive order"; and if the predicted TTA is greater than or equal to the threshold value, the computer model may classify the order as a "normal order".

In some other embodiments, the computer model is trained (e.g., via the machine-learning training module 230) to operate as a classification machine-learning model that uses one or more features (e.g., TTA values or values of some other attractiveness metric) for each order to directly classify each order into an "attractive order" or "normal order". Alternatively, the computer model may be trained to utilize a clustering algorithm to develop two separate clusters of orders (e.g., for a recent/current time period) based on one or more features (e.g., TTA values or values of some other attractiveness metric) for each order. Then, for each order and depending on the developed clusters, the computer model may classify each order into a cluster of "attractive orders" or into a cluster of "normal orders".

In some embodiments, the order attractiveness determination module 223 may exclude a portion of orders (e.g., approximately 10% of placed orders) from determining their attractiveness. Instead, this portion of orders may be utilized (e.g., via the machine-learning training module 230) for training the computer model. By excluding the portion of orders and instead utilizing the excluded orders for training, biasing of the computer model may be avoided. For example, without reserving any orders for training, the computer model may predict that certain orders have low TTAs and show these orders to a fewer pickers. This may lead to their actual TTAs increasing, and thus to their incorrect identification as "attractive orders".

The threshold determination module 225 may determine the threshold value utilized by the computer model to classify an order. The threshold determination module 225 may determine the threshold value at a warehouse level (or, alternatively, at a zonal level), and determined threshold value may be common for a plurality of orders placed with the online concierge system 140 within a particular warehouse or zone. The threshold determination module 225 determines the threshold value as, e.g., a daily median TTA within the particular warehouse or at the particular zone. More generally, the threshold determination module 225 may determine the threshold value based on amounts of time for a plurality of pickers associated with the online concierge system 140 to accept a plurality of orders over a time period once the plurality of orders are made available to the plurality of pickers. The threshold determination module 225 may update the threshold value after the defined time period (e.g., after 12 hours or 24 hours).

The distance filter module 227 may expand over time, based on the classification of the order, a size of the area that encompasses a set of pickers associated with the online concierge system 140 that are available for accepting the order. The distance filter module 227 may expand the size of the area by increasing a radius of the area over time with an expansion rate that is based on the classification of the order, wherein a center of the area corresponds to a location of the warehouse associated with the order. The distance filter module 227 may expand the size of the area by increasing a radius of the area over time with a first expansion rate, when the order is classified by the computer model as a "normal order". And the distance filter module 227 may expand the size of the area by increasing the radius of the area over time with a second expansion rate that is less than the first expansion rate, when the order is classified by the computer model as an "attractive order". In this manner, the distance filter module 227 may expand a square of distance from the location of the warehouse over time linearly, but more slowly for the attractive orders, i.e., by the second expansion rate that is less than 1 (e.g., equal to 0.8). The distance filter module 227 may be configured to expand the size of the area over time such that the least amount of expansions of the size of the area is achieved with a constraint of a defined number of allowable late deliveries for orders placed with the online concierge system 140 within a predetermined time period. In one or more embodiments, a rate of expansion of the area is set to be fixed. In one or more other embodiments, a rate of expansion of the area is trained to achieve the least amount of expansions of the size of the area with the constraint of the defined number of allowable late deliveries within the predetermined time period.

Prior to expanding the size of the area, the initial radius determination module 229 may set a radius for the area of an initial size such that the area of the initial size encompasses at least a threshold starting number of pickers (e.g., 20 pickers) that would be available for accepting an order placed with the online concierge system 140. A center of the area of the initial size having an initial radius value set by the initial radius determination module 229 corresponds to a location of a warehouse associated with the order.

The content presentation module 210 may cause a device of each picker (e.g., the picker client device 110) in the set of available pickers located within the area of the expanded size to display an availability of the order for acceptance by each picker in the set of available pickers. Prior to expanding the size of the area, the content presentation module 210 may cause a device of each picker (e.g., the picker client device 110) located within the area of the initial size to display an availability of the order for acceptance by each picker located within the area of the initial size.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The machine-learning training module 230 trains the computer model that is deployed by the order attractiveness determination module 223 to predict a metric (e.g., TTA) for an order placed with the online concierge system 140, wherein the metric quantifies an attractiveness of the order. The machine-learning training module 230 may utilize one or more features for a set of sample orders (e.g., a monetary value for each sample order, a size of each sample order, etc., as available at the data store 240) to train the computer model. To avoid any feedback loop that would cause a bias prediction of an attractiveness metric, the machine-learning training module 230 may train the computer model using a subset of existing orders (e.g., deliveries) associated with a given warehouse or a zone. This subset of orders used for training the computer model may remain unaffected by the actions of the computer model and the order management module 220, as the batching process takes precedence in influencing decisions of the computer model over time. The machine-learning training module 230 may retrain the computer model according to a predefined schedule and a predefined periodicity (e.g., once daily at a specific time of day). The machine-learning training module 230 may train the computer model for each warehouse or for each zone by utilizing features of only those sample orders associated with a particular warehouse or a particular zone. The computer model may be trained to utilize a different machine-learning algorithm for a different warehouse, i.e., a warehouse-based machine-learning algorithm. A set of parameters that define each warehouse-based machine-learning algorithm of the computer model may be stored at one or more non-transitory computer-readable media of, e.g., the order attractiveness determination module 223 and/or the data store 240.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

Figure 3A:
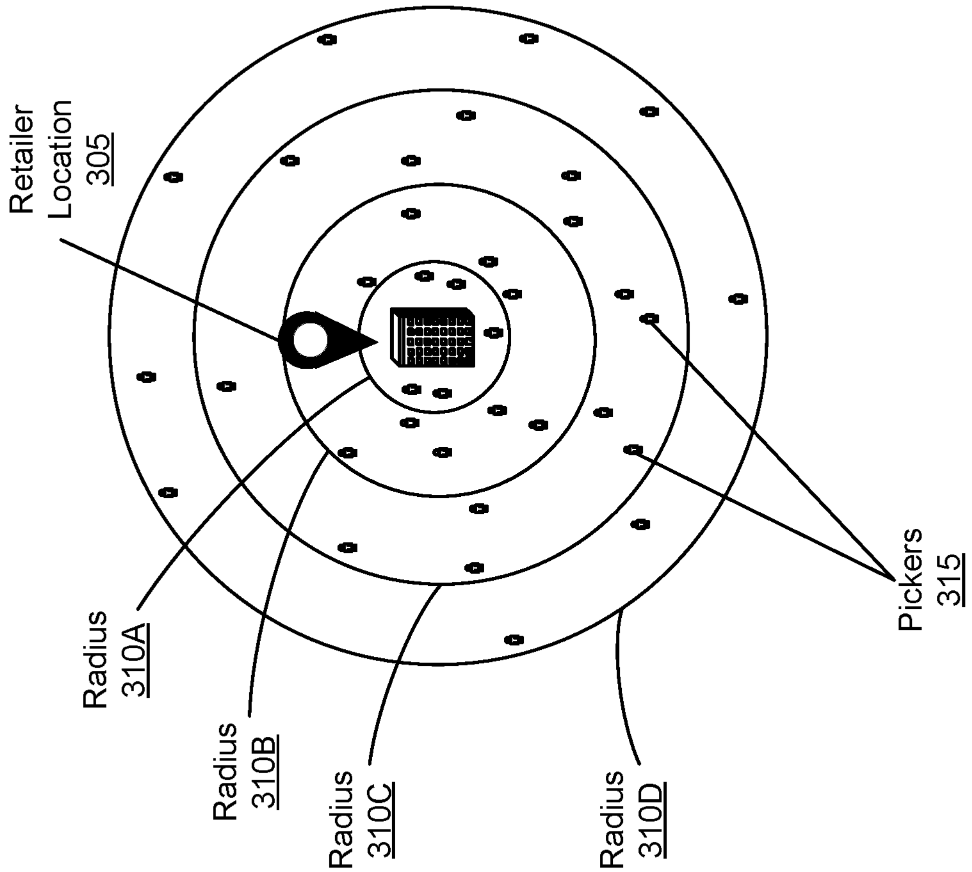
FIG. 3A illustrates an example diagram of order specific expansion of an area that encompasses pickers available for accepting a normal order placed with an online concierge system, in accordance with one or more embodiments.

FIG. 3A illustrates an example diagram 300 of order specific expansion of an area that encompasses pickers available for accepting a "normal order" placed with the online concierge system 140, in accordance with one or more embodiments. Prior to the area expansion shown in FIG. 3A, the computer model deployed by the order attractiveness determination module 223 classified an order as a "normal order". A retailer location 305 (i.e., location of a warehouse) corresponds to a center of the area being expanded. Prior to the area expansion, the initial radius determination module 229 sets a radius of the area to a radius 310A such that the area with the radius 310A encompasses at least a threshold number of pickers 315 available for accepting the order.

After a first time period, as no picker 315 located within the area of the radius 310A accepted the order, the distance filter module 227 increases a radius of the area from the radius 310A to a new radius 310B. After a second time period (e.g., equal to the first time period), as no picker 315 located within the area of the radius 310B accepted the order, the distance filter module 227 increases a radius of the area from the radius 310B to a new radius 310C. After a third time period (e.g., equal to the first and second time periods), as no picker 315 from the area of the radius 310C accepted the order, the distance filter module 227 increases a radius of the area from the radius 310C to a new and final radius 310D.

Figure 3B:
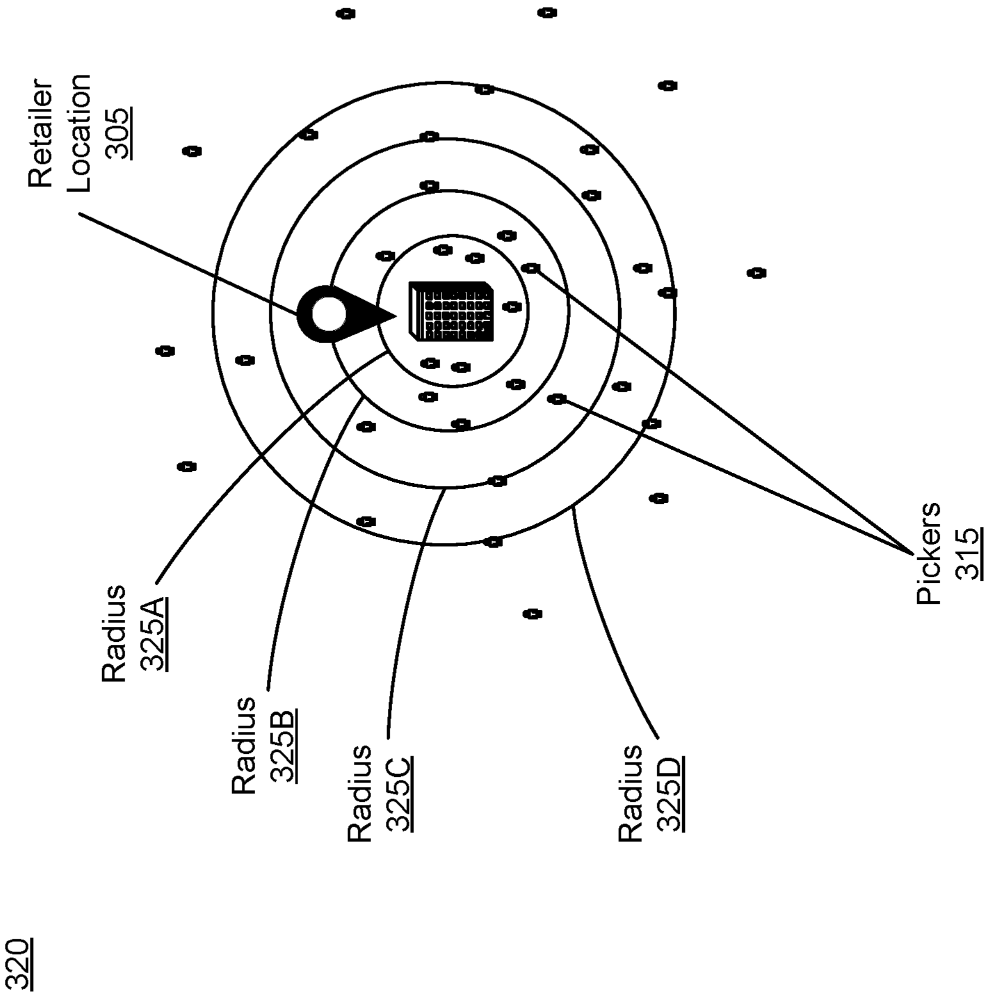
FIG. 3B illustrates an example diagram of order specific expansion of an area that encompasses pickers available for accepting an attractive order placed with an online concierge system, in accordance with one or more embodiments.

FIG. 3B illustrates an example diagram 320 of order specific expansion of an area that encompasses pickers available for accepting an "attractive order" placed with the online concierge system 140, in accordance with one or more embodiments. Prior to the area expansion shown in FIG. 3B, the computer model deployed by the order attractiveness determination module 223 classified an order as an "attractive order". A retailer location 305 (i.e., location of a warehouse) corresponds to a center of the area being expanded and is the same location as illustrated in FIG. 3B. Also, pickers 315 shown in FIG. 3B are the same pickers 315 shown in FIG. 3A. Prior to the area expansion, the initial radius determination module 229 sets a radius of the area to a radius 325A such that the area with the radius 325A encompasses at least a threshold number of pickers 315 available for accepting the order. The radius 325A may be the same as the radius 310A. Alternatively, the radius 325A may be smaller than the radius 310A.

After the first time period, as no picker 315 located within the area of the radius 325A accepted the order, the distance filter module 227 increases a radius of the area from the radius 325A to a new radius 325B. Note that a rate of radius increase from the radius 325A to the radius 325B in FIG. 3B is less than a rate of radius increase from the radius 310A to the radius 310B in FIG. 3A. After the second time period, as no picker 315 located within the area of the radius 325B accepted the order, the distance filter module 227 increases a radius of the area from the radius 325B to a new radius 325C. Note that a rate of radius increase from the radius 325B to the radius 325C in FIG. 3B is less than a rate of radius increase from the radius 310B to the radius 310C in FIG. 3A. After the third time period, as no picker 315 from the area of the radius 325C accepted the order, the distance filter module 227 increases a radius of the area from the radius 325C to a new and final radius 325D. Note that a rate of radius increase from the radius 325C to the radius 325D in FIG. 3B is less than a rate of radius increase from the radius 310C to the radius 310D in FIG. 3A.

Figure 4:
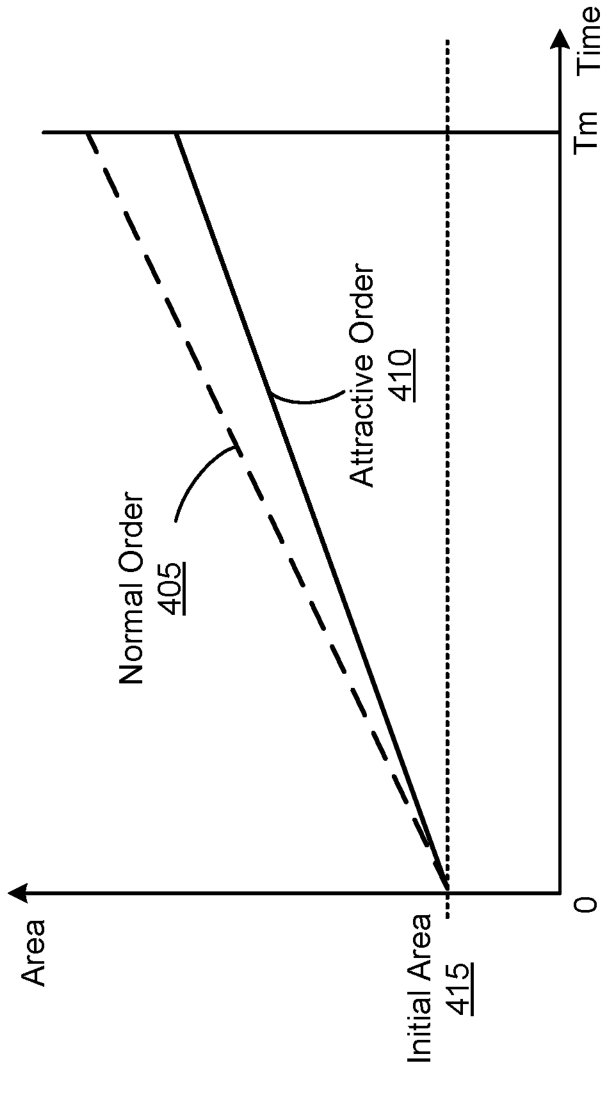
FIG. 4 illustrates an example graph of order specific expansion of an area that encompasses pickers available for accepting an order placed with an online concierge system, in accordance with one or more embodiments.

FIG. 4 illustrates an example graph 400 of order specific expansion of an area that encompasses pickers available for accepting an order placed with the online concierge system 140, in accordance with one or more embodiments. A plot 405 shows a linear increase of a size of the area (e.g., square of distance from a location of a warehouse) as a function of time for a "normal order". A plot 410 shows a linear increase of a size of the area (e.g., square of distance from the location of the warehouse) as a function of time for an "attractive order". It can be observed by comparing the plots 405 and 410 that a rate of increase is smaller for the "attractive order" (i.e., the plot 410) than for the "normal order" (i.e., the plot 405). Thus, there are two different rates of radii expansion for "normal orders" versus "attractive orders", i.e., an area associated with "attractive orders" would expand at a slower rate than for "normal orders". Both plots 405 and 410 may start at a zero time that refers to a time stamp when an order is created. Also, both plots 405 and 410 starts at the initial area 415 that encompasses at least a threshold number of pickers (e.g., 20 pickers) that are available for accepting the order. Alternatively, the plot 410 may start at an initial area of a smaller size than an initial area for the plot 405. A time instant Tm in FIG. 4 refers to a maximum assignable act before late (MAABL) time that corresponds to a time instant when the area expansion stops for both "attractive" and "normal" orders.

An initial distance from the location of the warehouse that defines the initial area 415 can be referred to as "ds". The value of "ds" may be set (e.g., via the initial radius determination module 229) to ascertain a minimum number of pickers (e.g., chosen as an arbitrary constant). The value of "ds" may be also a function of a density of pickers. If the density of pickers is higher, then the value of "ds" is set (e.g., via the initial radius determination module 229) to a smaller value, and vice versa. The value of "ds" may be also a function of a current condition of a supply in a given zone. The value of "ds" may be set to a smaller value if the current level of the supply is above a threshold level, and the value of "ds" may be set to a higher value if the current level of the supply is below the threshold level. Once determined for a given zone, the value of "ds" may be stored at, e.g., the data store 240.

In some embodiment, the expansion rate for "normal orders" (i.e., the increase rate of the plot 405) may be given as [30−ds]/Tm. The expansion rate for "attractive orders" (i.e., the increase rate of the plot 410) can be referred to as $\alpha$, and $\alpha \in [0.8, 1)$. The value of $\alpha$ may be determined by, e.g., the order level experimentation. The value of $\alpha$ may be fixed for all zones. Alternatively, the value of $\alpha$ may be different for different "attractive orders", i.e., the value of $\alpha$ may be different for different categories of "attractive orders".

Although the embodiments of the present disclosure are directed to two groups of orders (e.g., "attractive" and "normal" orders), it should be understood that orders can be divided, based on their attractiveness metrics, into more than two groups. For example, the orders can be classified into "very attractive", "attractive", "somewhat attractive" and "normal" groups. Each of these groups would allow for a different rate of expansion of an area of available pickers based on their predicted attractiveness metrics.

Figure 5:
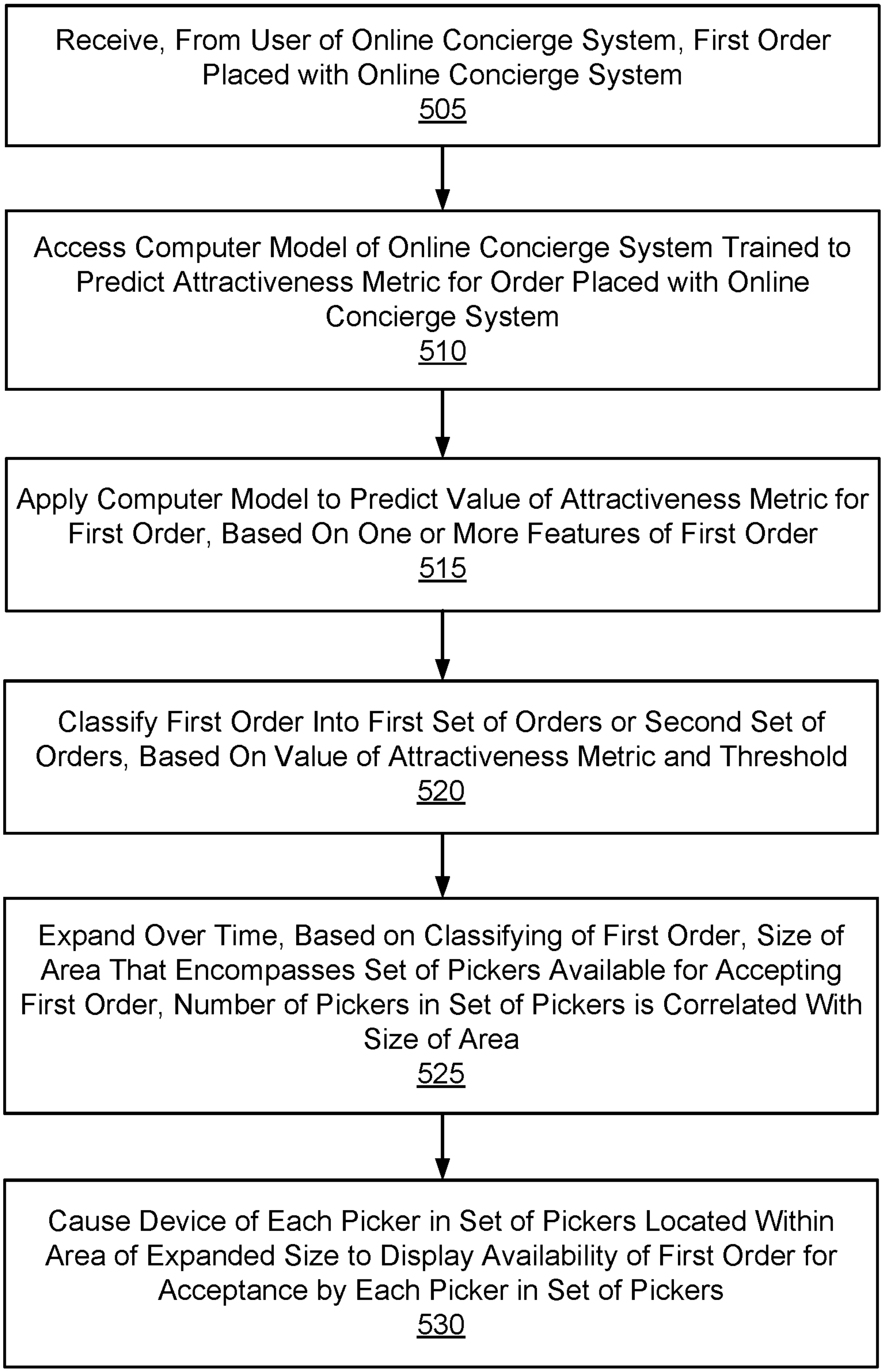
FIG. 5 is a flowchart of a method of order specific expansion of an area that encompasses pickers available for accepting an order placed with an online concierge system, in accordance with one or more embodiments.

FIG. 5 is a flowchart of a method of order specific expansion of an area that encompasses pickers available for accepting an order placed with an online concierge system, in accordance with one or more embodiments. Alternative embodiments may include more, fewer, or different steps from those illustrated in FIG. 5, and the steps may be performed in a different order from that illustrated in FIG. 5. These steps may be performed by an online concierge system (e.g., the online concierge system 140). Additionally, each of these steps may be performed automatically by the online concierge system without human intervention.

The online concierge system 140 receives 505 (e.g., via the order request module 221), from a user of the online concierge system 140, a first order placed with the online concierge system 140. The online concierge system 140 accesses 510 a computer model of the online concierge system 140 (e.g., the computer model deployed by the order attractiveness determination module 223) trained to predict an attractiveness metric for an order placed with the online concierge system 140.

The online concierge system 140 applies 515 (e.g., via the order attractiveness determination module 223) the computer model to predict a value of the attractiveness metric for the first order, based on one or more features of the first order. The online concierge system 140 may apply the computer model to predict the value of the attractiveness metric by estimating an amount of time (e.g., TTA) for a picker of a plurality of pickers associated with the online concierge system 140 to accept the first order once the first order is made available to the plurality of pickers. The online concierge system 140 may apply the computer model to predict the value of the attractiveness metric for the first order when a driving distance for picking items of the first order is zero (e.g., at a warehouse level). The online concierge system 140 may extract the one or more features associated with the first order and provide the extracted one or more features (e.g., via the order request module 221) as one or more inputs into the computer model. The one or more features may comprise at least one of: a monetary value of the first order, a monetary value of a tip provided by the user associated with the first order, a delivery distance associated with the first order, a total number of items in the first order, one or more features of the items in the first order, or information about a service option for delivery of the first order.

The online concierge system 140 classifies 520 (e.g., via the order attractiveness determination module 223) the first order into a first set of orders or a second set of orders, based on the value of the attractiveness metric and a threshold. The online concierge system 140 may classify the first order into the first set of orders (e.g., as an "attractive order") if the value of the attractiveness metric meets or exceeds the threshold. Otherwise, the first order may be classified into the second set of orders, e.g., as a "normal order". The online concierge system 140 may determine (e.g., via the threshold determination module 225) the threshold based on a median of amounts of time for a plurality of pickers associated with the online concierge system 140 to accept a plurality of orders over a time period once the plurality of orders are made available to the plurality of pickers.

The online concierge system 140 expands 525 over time (e.g., via the distance filter module 227), based on the classifying of the first order, a size of an area that encompasses a set of pickers associated with the online concierge system 140 available for accepting the first order, wherein a number of pickers in the set is correlated with the size of the area. The online concierge system 140 may expand (e.g., via the distance filter module 227) the size of the area by increasing a radius of the area over time with an expansion rate that is based on the classifying of the first order, wherein a center of the area may correspond to a physical location (e.g., location of a warehouse) associated with the first order. The online concierge system 140 may expand (e.g., via the distance filter module 227) the size of the area by increasing a radius of the area over time with a first expansion rate, when the first order is classified into the first set. The online concierge system 140 may expand (e.g., via the distance filter module 227) the size of the area by increasing the radius of the area over time with a second expansion rate that is less than the first expansion rate, when the first order is classified into the second set. The second expansion rate may be less than one. The online concierge system 140 may expand (e.g., via the distance filter module 227) the size of the area over time such that the least amount of expansions of the size of the area is achieved with a constraint of a defined number of allowable late deliveries for orders placed with the online concierge system 140.

The online concierge system 140 causes 530 (e.g., via the content presentation module 210) a device of each picker (e.g., the picker client device 110) in the set of available pickers located within the area of the expanded size to display an availability of the first order for acceptance by each picker in the set. Prior to expanding the size of the area, the online concierge system 140 may set (e.g., via the initial radius determination module 229) a radius for the area of an initial size based a number of pickers in an initial set of pickers associated with the online concierge system 140, wherein a center of the area of the initial size may correspond to a physical location (e.g., location of a warehouse) associated with the first order. Prior to expanding the size of the area, the online concierge system 140 may cause (e.g., via the content presentation module 210) a device of each picker (e.g., the picker client device 110) in the initial set located within the area of the initial size to display an availability of the first order for acceptance by each picker in the initial set.

Embodiments of the present disclosure are directed to order specific expansion of an area (i.e., maximum distance filter) that encompasses pickers available for accepting an order placed with an online concierge system. A machine-learning algorithm of a computer model is deployed to predict an attractiveness metric (e.g., TTA) for an order placed with the online concierge system 140, and the online concierge system 140 uses the predicted attractiveness metric to classify the order as an "attractive order" or a "normal order". The expansion of maximum distance filter can be adjusted based on an attractiveness of each order, where the attractiveness is measured as a TTA predicted by deployment of the computer model.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:

receiving, via a network and from a device associated with a user of the computer system, information about an order placed with the computer system including one or more features of the order;

accessing a machine-learning model that is trained to predict an attractiveness metric for the order, the attractiveness metric including information about a time to accept (TTA) the order that represents an amount of time for a picker to accept, via a device associated with the picker, the order for fulfillment once the order is made available at the device associated with the picker;

applying the machine-learning model to the one or more features of the order to generate the TTA for the order;

comparing the TTA for the order to a threshold value;

classifying, for a current time period and based on comparing the TTA for the order to the threshold value, the order into a first set of normal orders or a second set of attractive orders;

expanding, for the current time period and based on the classifying the order, a size of an area that encompasses a set of pickers available for accepting the order to match the set of pickers to the order such that a least amount of expansions of the size of the area is performed with a constraint of having a defined number of allowable late deliveries for orders placed with the computer system, wherein a number of pickers in the set of pickers is correlated with the size of the area;

identifying a set of devices associated with the set of pickers located within the area of the expanded size; and causing each device of the set of devices that is associated with each picker from the set of pickers located within the area of the expanded size to display a user interface with an indication about an availability of the order for acceptance by each picker from the set of pickers, the indication about the availability of the order causes a corresponding picker in the set of pickers to accept a servicing of the order and collect, in a retailer location and after being assigned for the servicing of the order, items for the order.

2. The method of claim 1, wherein expanding the size of the area comprises:

increasing a radius of the area over time with an expansion rate that is based on the classifying the order, and wherein a center of the area corresponds to a physical location associated with the order.

3. The method of claim 1, wherein expanding the size of the area comprises:

increasing a radius of the area over time with a first expansion rate, when the order is classified into the first set of normal orders; and increasing the radius of the area over time with a second expansion rate that is less than the first expansion rate, when the order is classified into the second set of attractive orders.

4. The method of claim 3, wherein the second expansion rate is less than one.

5. The method of claim 1, further comprising:

prior to expanding the size of the area, causing a device associated with each picker in an initial set of pickers located within the area of an initial size to display an availability of the order for acceptance by each picker in the initial set, wherein a center of the area of the initial size corresponds to a physical location associated with the order.

6. The method of claim 5, further comprising:

prior to expanding the size of the area, setting a radius for the area of the initial size based on a number of pickers in the initial set.

7. The method of claim 1, further comprising:

determining the threshold value based on a median of amounts of time for a plurality of pickers to accept a plurality of orders over a time period once the plurality of orders are made available to the plurality of pickers.

8. The method of claim 1, wherein applying the machine-learning model comprises:

applying the machine-learning model to generate the TTA for the order when a driving distance for picking items of the order is zero.

9. The method of claim 1, further comprising:

extracting, from a database of the computer system, the one or more features associated with the order.

10. The method of claim 1, wherein the one or more features comprise at least one of: a monetary value of the order, a monetary value of a tip provided by the user associated with the order, a delivery distance associated with the order, a total number of items in the order, one or more features of the items in the order, or information about a service option for delivery of the order.

11. The method of claim 1, wherein expanding the size of the area comprises:

setting an initial radius of the area using information about a density of pickers in the area of an initial size defined by the initial radius; and increasing a radius of the area over time starting from the initial radius.

12. The method of claim 1, wherein expanding the size of the area comprises:

setting an initial radius of the area using information about a minimum number of pickers in the area of an initial size defined by the initial radius; and increasing a radius of the area over time starting from the initial radius.

13. A computer program product comprising a non-transitory computer readable storage medium having instructions encoded thereon that, when executed by a processor, cause the processor to perform steps comprising:

receiving, via a network and from a device associated with a user of a computer system, information about an order placed with the computer system including one or more features of the order;

accessing a machine-learning model that is trained to predict an attractiveness metric for the order, the attractiveness metric including information about a time to accept (TTA) the order that represents an amount of time for a picker to accept, via a device associated with the picker, the order for fulfillment once the order is made available at the device associated with the picker;

applying the machine-learning model to the one or more features of the order to generate the TTA for the order;

comparing the TTA for the order to a threshold value;

classifying, for a current time period and based on comparing the TTA for the order to the threshold value, the order into a first set of normal orders or a second set of attractive orders;

expanding, for the current time period and based on the classifying the order, a size of an area that encompasses a set of pickers available for accepting the order to match the set of pickers to the order such that a least amount of expansions of the size of the area is performed with a constraint of having a defined number of allowable late deliveries for orders placed with the computer system, wherein a number of pickers in the set of pickers is correlated with the size of the area;

identifying a set of devices associated with the set of pickers located within the area of the expanded size; and causing each device of the set of devices that is associated with each picker from the set of pickers located within the area of the expanded size to display a user interface with an indication about an availability of the order for acceptance by each picker from the set of pickers, the indication about the availability of the order causes a corresponding picker in the set of pickers to accept a servicing of the order and collect, in a retailer location and after being assigned for the servicing of the order, items for the order.

14. The computer program product of claim 13, wherein the instructions further cause the processor to perform steps comprising:

expanding the size of the area by increasing a radius of the area over time with an expansion rate that is based on the classifying the order, and wherein a center of the area corresponds to a physical location associated with the order.

15. The computer program product of claim 13, wherein the instructions further cause the processor to perform steps comprising:

expanding the size of the area by increasing a radius of the area over time with a first expansion rate, when the order is classified into the first set of normal orders; and expanding the size of the area by increasing the radius of the area over time with a second expansion rate that is less than the first expansion rate, when the order is classified into the second set of attractive orders.

16. The computer program product of claim 13, wherein the instructions further cause the processor to perform steps comprising:

prior to expanding the size of the area, setting a radius for the area of an initial size based on a number of pickers in an initial set of pickers; and prior to expanding the size of the area, causing a device associated with each picker in the initial set located within the area of the initial size to display an availability of the order for acceptance by each picker in the initial set, and wherein a center of the area of the initial size corresponds to a physical location associated with the order.

17. The computer program product of claim 13, wherein the instructions further cause the processor to perform steps comprising:

determining the threshold value based on a median of amounts of time for a plurality of pickers to accept a plurality of orders over a time period once the plurality of orders are made available to the plurality of pickers.

18. A computer system comprising:

a processor; and a non-transitory computer-readable storage medium having instructions that, when executed by the processor, cause the computer system to perform steps comprising:

receiving, via a network and from a device associated with a user of the computer system, information about an order placed with the computer system including one or more features of the order;

accessing a machine-learning model that is trained to predict an attractiveness metric for the order, the attractiveness metric including information about a time to accept (TTA) the order that represents an amount of time for a picker to accept, via a device associated with the picker, the order for fulfillment once the order is made available at the device associated with the picker;

applying the machine-learning model to the one or more features of the order to generate the TTA for the order;

comparing the TTA for the order to a threshold value;

classifying, for a current time period and based on comparing the TTA for the order to the threshold value, the order into a first set of normal orders or a second set of attractive orders;

expanding, for the current time period and based on the classifying the order, a size of an area that encompasses a set of pickers available for accepting the order to match the set of pickers to the order such that a least amount of expansions of the size of the area is performed with a constraint of having a defined number of allowable late deliveries for orders placed with the computer system, wherein a number of pickers in the set of pickers is correlated with the size of the area;

identifying a set of devices associated with the set of pickers located within the area of the expanded size; and causing each device of the set of devices that is associated with each picker from the set of pickers located within the area of the expanded size to display a user interface with an indication about an availability of the order for acceptance by each picker from the set of pickers, the indication about the availability of the order causes a corresponding picker in the set of pickers to accept a servicing of the order and collect, in a retailer location and after being assigned for the servicing of the order, items for the order.

* * * * *